US008028904B2

(12) United States Patent
Meehan et al.

(10) Patent No.: US 8,028,904 B2
(45) Date of Patent: Oct. 4, 2011

(54) RADIO FREQUENCY IDENTIFIERS IN GAME TICKETS

(75) Inventors: Richard Meehan, Kingstown, RI (US); Stephen Carney, Barrington, RI (US); Jennifer Seymour, Roswell, GA (US); Craig Fitzgerald, Alpharetta, GA (US); Richard Finocchio, Everett, MA (US)

(73) Assignee: Gtech Rhode Island Corporation, Providence, RI (US)

( * ) Notice: Subject to any disclaimer, the term of this patent is extended or adjusted under 35 U.S.C. 154(b) by 78 days.

(21) Appl. No.: 12/476,188

(22) Filed: Jun. 1, 2009

(65) Prior Publication Data
US 2009/0236417 A1 Sep. 24, 2009

Related U.S. Application Data

(60) Division of application No. 10/723,410, filed on Nov. 24, 2003, now Pat. No. 7,540,413, which is a continuation-in-part of application No. 10/392,618, filed on Mar. 19, 2003, now Pat. No. 7,017,805.

(51) Int. Cl.
G06F 7/08 (2006.01)
(52) U.S. Cl. ............. 235/381; 902/23; 483/17; 283/903
(58) Field of Classification Search .......... 235/375–376, 235/380, 451, 487, 492; 902/23; 463/17, 463/16; 283/903
See application file for complete search history.

(56) References Cited

U.S. PATENT DOCUMENTS

| 5,069,453 | A | | 12/1991 | Koza et al. |
|---|---|---|---|---|
| 5,112,050 | A | | 5/1992 | Koza et al. |
| 5,475,205 | A | * | 12/1995 | Behm et al. ................... 235/375 |
| 5,580,311 | A | | 12/1996 | Haste, III |
| 5,681,065 | A | | 10/1997 | Rua, Jr. et al. |
| 5,770,533 | A | | 6/1998 | Franchi |
| 5,818,019 | A | * | 10/1998 | Irwin et al. ................... 235/375 |
| 5,949,042 | A | | 9/1999 | Dietz, II et al. |
| 6,000,725 | A | | 12/1999 | Nicolosi et al. |
| 6,241,606 | B1 | | 6/2001 | Riendeau et al. |
| 6,400,272 | B1 | | 6/2002 | Holtzman et al. |
| 6,875,105 | B1 | * | 4/2005 | Behm et al. ................... 463/17 |
| 6,899,621 | B2 | | 5/2005 | Behm et al. |
| 2002/0119817 | A1 | | 8/2002 | Behm et al. |
| 2003/0186734 | A1 | | 10/2003 | LeMay et al. |
| 2003/0186739 | A1 | | 10/2003 | Paulsen et al. |
| 2004/0204222 | A1 | | 10/2004 | Roberts |

OTHER PUBLICATIONS

Daniel W. Engels, Technical Memo, A Comparison of the Electronic Product Code Identification Scheme & the Internet Protocol Address Identification Scheme, Auto-ID Center, Massachusetts Institute of Technology, Cambridge, MA 02139-4307, Published Jun. 1, 2002.
Sanjay Sarma, White Paper, Towards the 5 Tag, Auto-ID Center, Massachusetts Institute of Technology, Cambridge, MA 02139-4307, Published Nov. 1, 2001.

* cited by examiner

Primary Examiner — Michael G Lee
Assistant Examiner — Kristy A Haupt
(74) Attorney, Agent, or Firm — Sullivan & Worcester LLP; Christopher T. McWhinney

(57) ABSTRACT

Systems and methods of distributing, dispensing and validating game tickets provide for the use of radio frequency identifiers (RFIDS). Game ticket consumables may also be tracked with RFIDS. Ticket data such as game numbers, void if removed numbers, theme descriptions, place styles, price points and player account information can be stored to a memory of a game ticket, where the ticket is capable of transmitting the ticket data as an RF signal. Approaches also provide for the use of RFIDS in game sponsor/ticket printer facilities, ticket warehouse facilities and ticket destruction facilities.

8 Claims, 13 Drawing Sheets

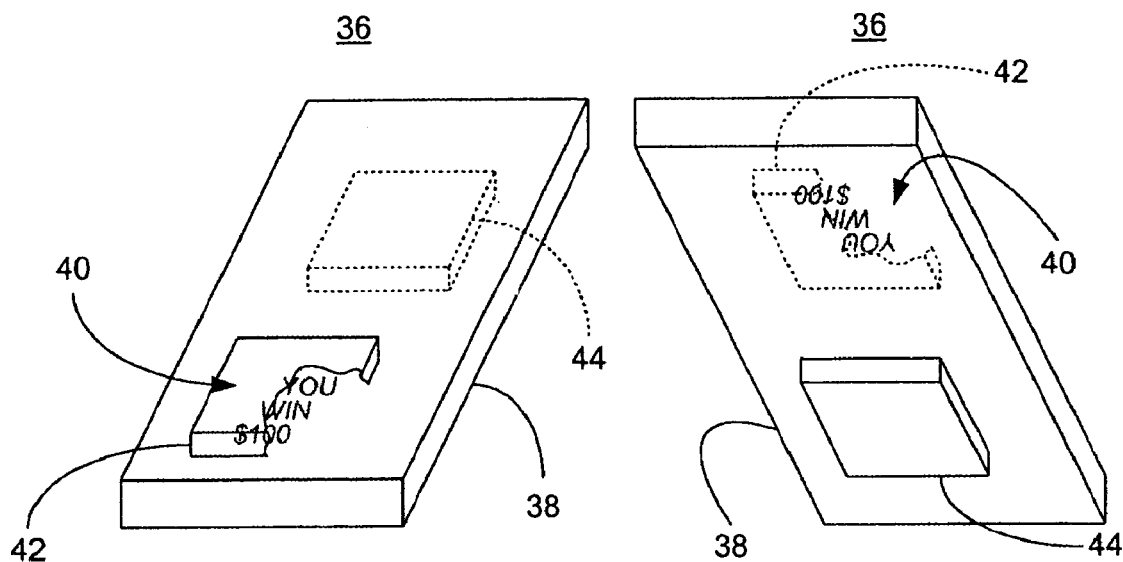
FIG. 2A  FIG. 2B
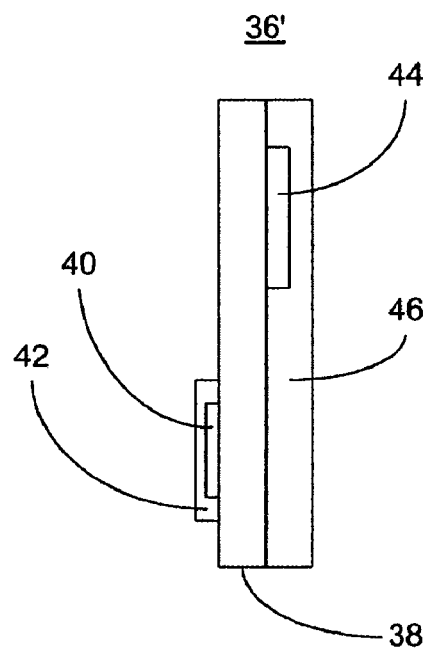
FIG. 3

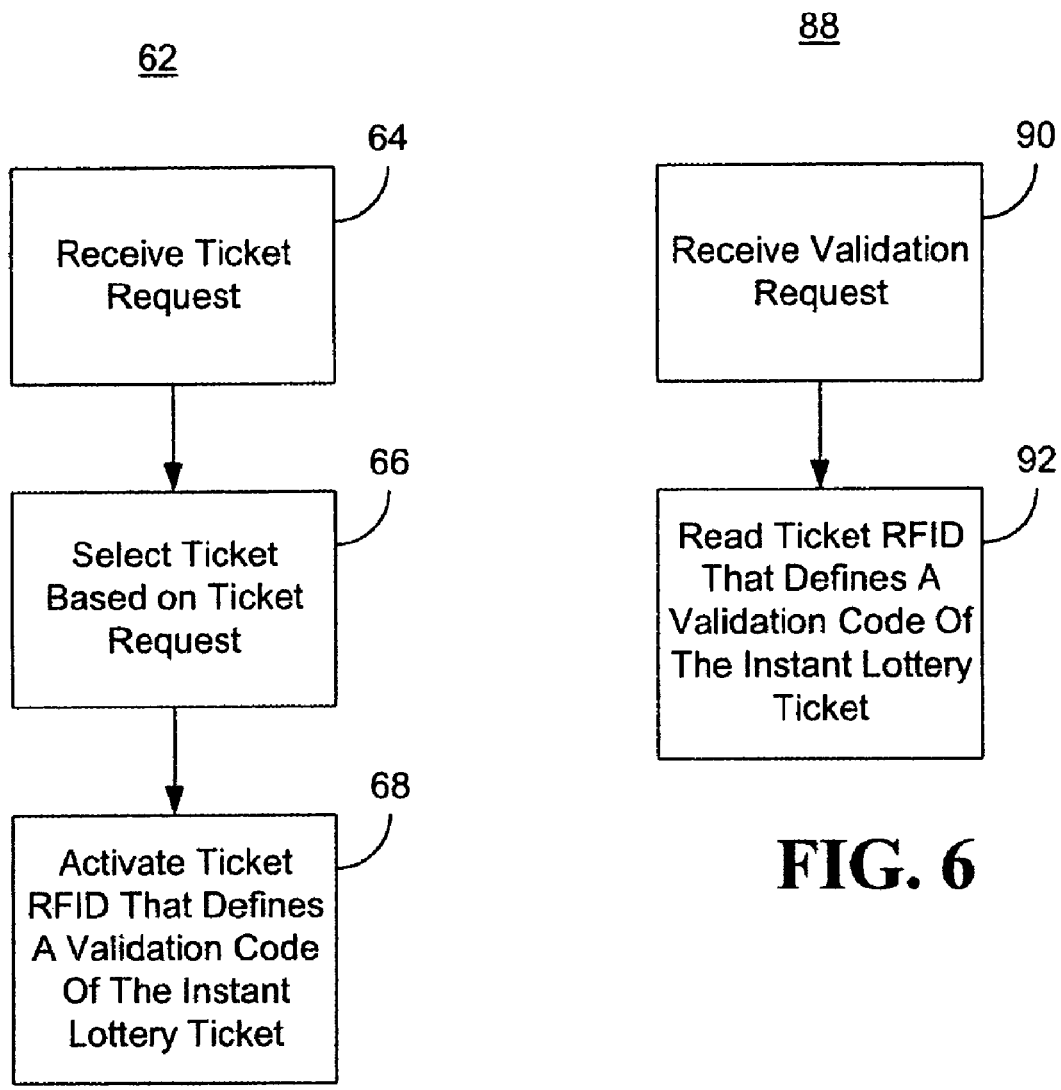

RADIO FREQUENCY IDENTIFIERS IN GAME TICKETS

PRIORITY CLAIM AND CROSS-REFERENCE TO RELATED APPLICATIONS

This application is a divisional of U.S. patent application Ser. No. 10/723,410, filed Nov. 24, 2003, U.S. Pat. No. 7,540,413, dated Jun. 2, 2009, which is a continuation-in-part of U.S. application Ser. No. 10/392,618 filed on Mar. 19, 2003, U.S. Pat. No. 7,017,805, dated Mar. 28, 2006. This application claims priority to said applications under 35 U.S.C. §120 and 121. The present application is also related to U.S. patent application Ser. No. 09/342,150, filed on Jun. 29, 1999, U.S. Pat. No. 6,702,672, dated Mar. 9, 2004. The entire contents of the original disclosure of said applications is expressly incorporated herein in its entirety by reference thereto.

BACKGROUND

1. Technical Field

Embodiments of the present invention generally relate to gaming systems. More particularly, embodiments relate to the use of ticket radio frequency identifiers (RFIDs) to dispense and validate game tickets.

2. Discussion

Paper-based gaming systems come in a wide variety of formats and are increasing in popularity. Indeed, restaurant franchises often sponsor promotional games in which the consumer peels a mask from the side of a paper cup to determine whether he or she has won a prize, and the use of tickets in state-sponsored lotteries is widespread. For example, many states throughout the U.S. employ future draw or "numbers-type" lottery systems in which the user waits until the winning numbers are announced to determine whether the lottery ticket is a winning ticket, as well as instant lottery systems in which the consumer may determine whether the lottery ticket is a winning ticket immediately upon purchase. Instant lottery systems generally use tickets that contain either "predetermined" game data or "probability" game data. In the case of probability game data, the ticket often has a number of "scratch off" regions and the consumer scratches off a subset of the number of regions in accordance with the rules of the particular game being played. For example, the consumer might scratch off five out of seven regions in order to simulate a hand of poker. Thus, the consumer has a relatively high amount of control over whether or not he or she wins and the lottery sponsor has a somewhat reduced amount of control over the total winnings that must be paid out. Predetermined instant tickets, on the other hand, are given their winning or losing nature at the time of creation. For example, the ticket sponsor may determine in advance how many $100 winning tickets, $20 winning tickets, $1 winning tickets, etc., will be dispensed based on expected sales of the tickets. As a result, the ticket sponsor generally has more control over the total winnings to be paid.

In any case, a traditional gaming system involves dispensing the tickets to consumers and validating the tickets when they are presented for redemption. Typically, game tickets are distributed to game ticket retailers in packs, where the game tickets are activated on a pack-by-pack basis before shipment. Activation involves scanning a bar code located on a pack of lottery tickets. The bar code information for the pack is sent over a network connection to a host computer for tracking purposes. It has been determined that in certain instances, individuals such as ticket retailer employees have engaged in an unlawful activity commonly referred to as "fishing" in which the employee attempts to identify the winning tickets in a pack after activation. Identification can involve a wide variety of techniques ranging from holding the tickets up to a light source to applying carefully selected chemicals to the tickets. Indeed, fishing is a substantial concern with regard to instant tickets having predetermined game data. There is therefore a need for an approach to distributing and dispensing instant lottery tickets that minimizes the risk of fishing and other unlawful activities.

When a game ticket is presented to a game ticket retailer for redemption, the ticket is typically validated by scanning a bar code that is printed on the game ticket, where the bar code defines a validation code for the ticket. Generally, the validation code contains information such as a unique ticket number and batch number associated with the ticket. The bar code information is transmitted to the host computer, where the host computer determines whether the information matches a legitimate winning ticket. If so, the host computer notifies the game ticket retailer that the ticket is valid and may be redeemed. Unfortunately, the use of bar coding in the dispensing and validation processes can have a number of difficulties. For example, bar code scanners are known to have reliability problems, particularly when a portion of the bar code has rubbed off while in the possession of the consumer. Although it is possible to manually enter the bar code data, such an approach can be cumbersome and time consuming. Furthermore, bar code scanning equipment is large and relatively expensive. There is therefore a need for an approach to validating game tickets that is not subject to the shortcomings associated with bar codes.

BRIEF DESCRIPTION OF THE DRAWINGS

The various advantages of the embodiments of the present invention will become apparent to one skilled in the art by reading the following specification and appended claims, and by referencing the following drawings, in which:

FIGS. 2A and 2B are perspective views of an example of a game ticket according to one embodiment of the invention;

FIG. 3 is a side view of an example of a game ticket according to one embodiment of the invention;

FIG. 4 is a flowchart of an example of a method of dispensing game tickets to consumers according to one embodiment of the invention;

FIG. 6 is a flowchart of an example of a method of validating game tickets according to one embodiment of the invention;

DETAILED DESCRIPTION

Figure 1:
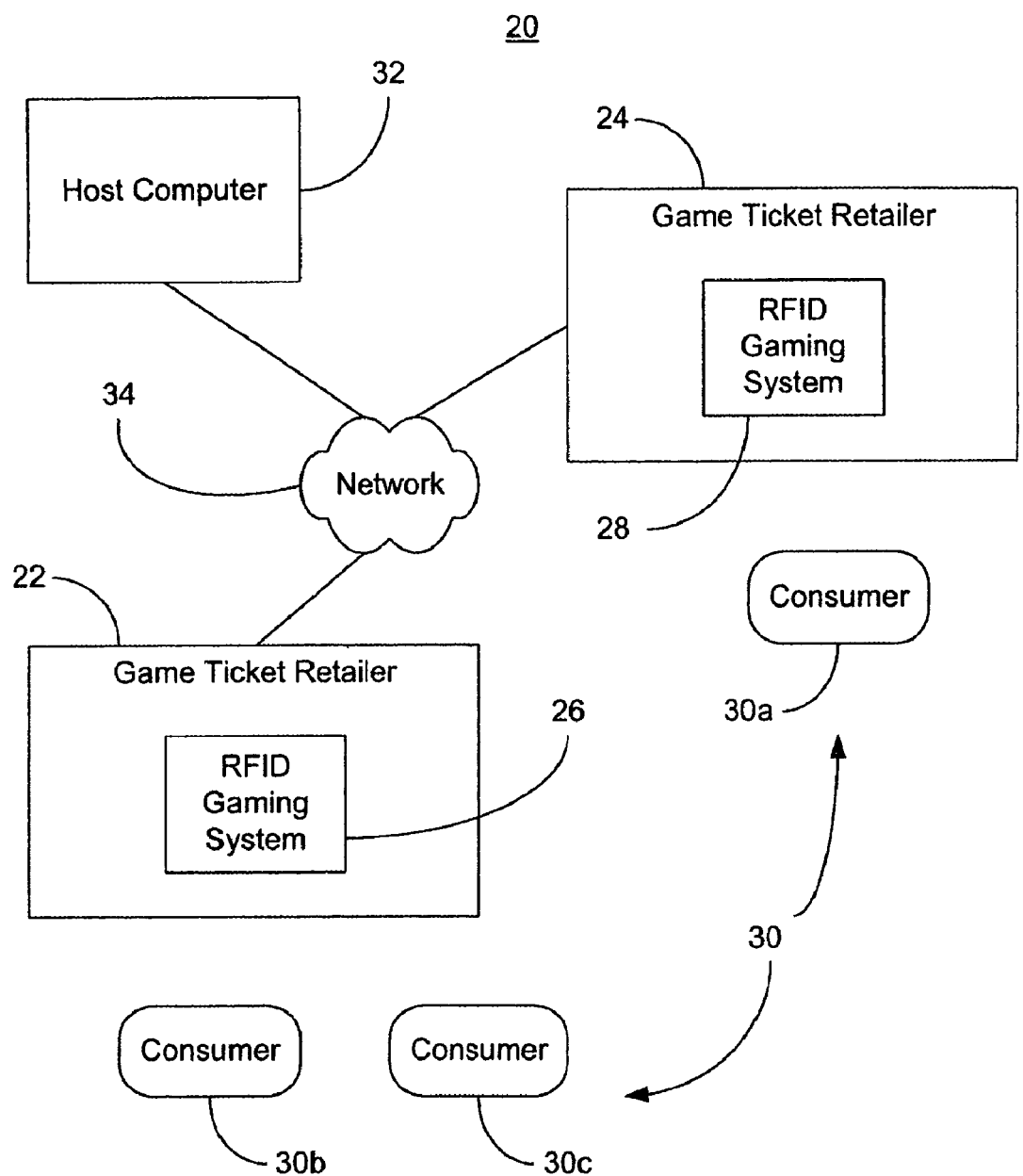
FIG. 1 is a block diagram of an example of a game ticketing architecture according to one embodiment of the invention.

FIG. 1 shows an architecture 20 in which one or more game ticket retailers 22, 24 participate in the dispensing and redemption of game tickets. Each game ticket retailer 22, 24 has a radio frequency identification (RFID) gaming system 26, 28, where retailer employees and/or consumers 30 (30a-30c) may interact with the RFID gaming systems 26, 28 in the process. For example, consumer 30a may use the RFID gaming system 28 to purchase an instant lottery ticket from game ticket retailer 24 and use the RFID gaming system 26 to redeem the lottery ticket at lottery ticket retailer 22. The retailers 22, 24 can communicate with a host computer 32 over a network 34 to implement ticket dispensing as well as ticket validation procedures in a secure manner. As will be discussed in greater detailer, the use of an RFID gaming system 26, 28, rather than conventional bar coding systems enables concerns such as theft, cost and difficulty of use to be substantially obviated.

While certain embodiments will be described with regard to instant lottery ticketing systems, the embodiments of the invention are not so limited. Indeed, architecture 20 can be used in any gaming scenario in which RFID technology may be employed. Notwithstanding, there are a number of aspects of instant lottery ticketing for which architecture 20 is well suited.

Turning now to FIGS. 2A and 2B, a front side and back side of an instant lottery ticket 36 are shown, respectively. Generally, the lottery ticket 36 has a substrate 38, which includes game data 40 and a removable mask 42 covering the game data 40. The game data 40 may be applied directly to the substrate 38, or may be printed on one or more intervening layers to reduce unlawful tampering with the ticket 36. An example of the use of intervening layers is described in U.S. Pat. No. 5,681,065 to Rua et al. The removable mask is of the "scratch-off" variety of material, which is widely available in industry. One example of such a material is Craigseal product 2580CH manufactured by Craig Adhesives Corp., Newark, N.J. There is also typically a layer of varnish or latex disposed between the game data 40 and the removable mask 42 in order to prevent destruction of the game data 40 when the mask 42 is removed.

The lottery ticket 36 also has a transponder 44 coupled to the substrate 38, where the transponder 44 stores a ticket RFID that defines a validation code of the lottery ticket 36. The term "coupled" is used herein to define electrical, mechanical, or any other type of connection between components. Such a connection can be made by adhesives, thermal fusion, particle deposition, or any other comniercially available technique. By using the ticket RFID to store the validation code, the lottery ticket 36 is given significantly more functionality than available under conventional techniques. For example, ticket-by-ticket activation and accountability can be achieved when the ticket 36 is dispensed, and faster and less expensive validation is possible when the ticket 36 is redeemed. FIG. 3 shows a ticket 36' having a protective layer 46 covering the transponder 44, where the protective layer 46 may include any suitable material such as lamination or other type of plastic.

Figure 9:
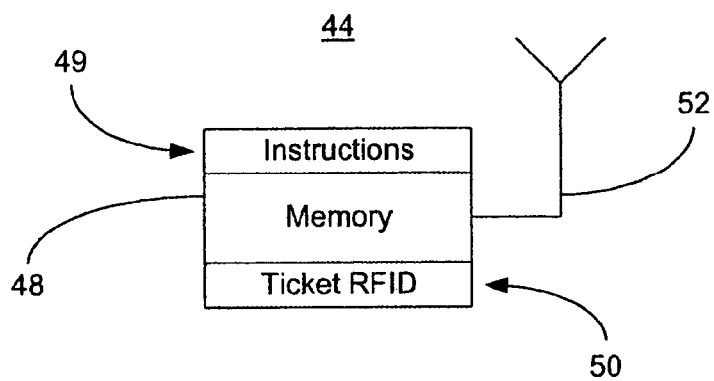
FIG. 9 is a block diagram of an example of a game ticket transponder according to one embodiment of the invention.

FIG. 9 shows one approach to the transponder 44 in greater detail. It can be seen that the transponder 44 includes a memory 48 such as a read-only memory (ROM), which stores the ticket RFID 50. An antenna 52 is operatively coupled to the memory 48, where the antenna 52 can receive an RF excitation signal and transmit the ticket RFID 50. In this regard, it should be noted that memory 48 also includes instructions 49 for detecting the RF excitation signal and causing the antenna 52 to transmit the ticket RFID 50.

Figure 10A:
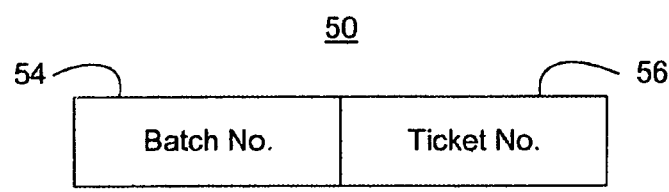
FIG. 10A is a diagram of an example of a ticket RFID according to one embodiment of the invention.

FIG. 10A shows one approach to the validation code that is defined by the ticket RFID 50 in greater detail. Specifically, the validation code includes a batch number 54 and a ticket number 56 corresponding to the lottery ticket 36 (FIGS. 2A and 2B). While the format of the validation code may vary, one approach is to allocate eight bits to the batch number and eight bits to the ticket number, where the validation code is a 16-bit value. In such a case, the 16-bit validation code is modulated onto the antenna 52 as ticket RFID 50. Thus, the RFID lottery system 26, 28 (FIG. 1) is able to uniquely identify each lottery ticket before it is dispensed, activate the lottery ticket based on the identification, uniquely identify the ticket when it is presented for redemption and authorize redemption based on the identification.

Figure 10B:
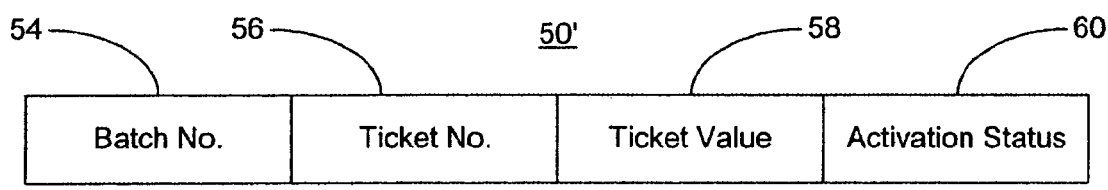
FIG. 10B is a diagram of an example of a ticket RFID according to an alternative embodiment of the invention.

FIG. 10B shows an alternative ticket RFID 50' in which the validation code defined by the ticket RFID 50' further includes a ticket value 58 and activation status 60. In this case, the transponder 44 (FIG. 9) could include programmable memory such as electrically erasable programmable read only memory (EEPROM), where the RFID lottery system 26, 28 (FIG. 1) writes the ticket value 58 and activation status 60 to the transponder memory upon activation of the lottery ticket. Such an approach enables the RFID lottery system to perform the validation locally, without the need to communicate with the host computer 32 (FIG. 1). Localized validation is discussed in greater detail below.

Turning now to FIG. 4, a method 62 of dispensing game tickets to consumers is shown. The method 62 can be implemented in an RFID gaming system 26, 28 (FIG. 1) as a set of instructions capable of being executed by a processor to achieve ticket dispensing. The instructions can be written using any number of well-known software programming techniques and can be stored in a wide variety of machine-readable media such EEPROM, compact disk ROM (CDROM), dynamic random access memory (DRAM), etc. Generally, processing block 64 provides for receiving a ticket request and block 66 provides for selecting a game ticket based on the ticket request. The game ticket can be associated with a promotional game or with a lottery such as a future draw lottery or instant lottery. The ticket request can be input by a consumer or retailer employee via any suitable interface such as a traditional keyboard, touch screen, etc. If various types of game tickets are available, block 66 can provide for identification of the selected type, and if only one type of game ticket is available, block 66 can merely identify the next ticket to be dispensed. The game ticket is activated at block 68 based on a ticket RFID that defines a validation code of the game ticket. It should be noted that activation of the particular ticket rather than the pack from which the ticket came significantly reduces the opportunity for "fishing" or other unlawful activity. Furthermore, the use of RFID technology provides for less expensive and less complicated equipment than available under conventional approaches.

Figure 5A:
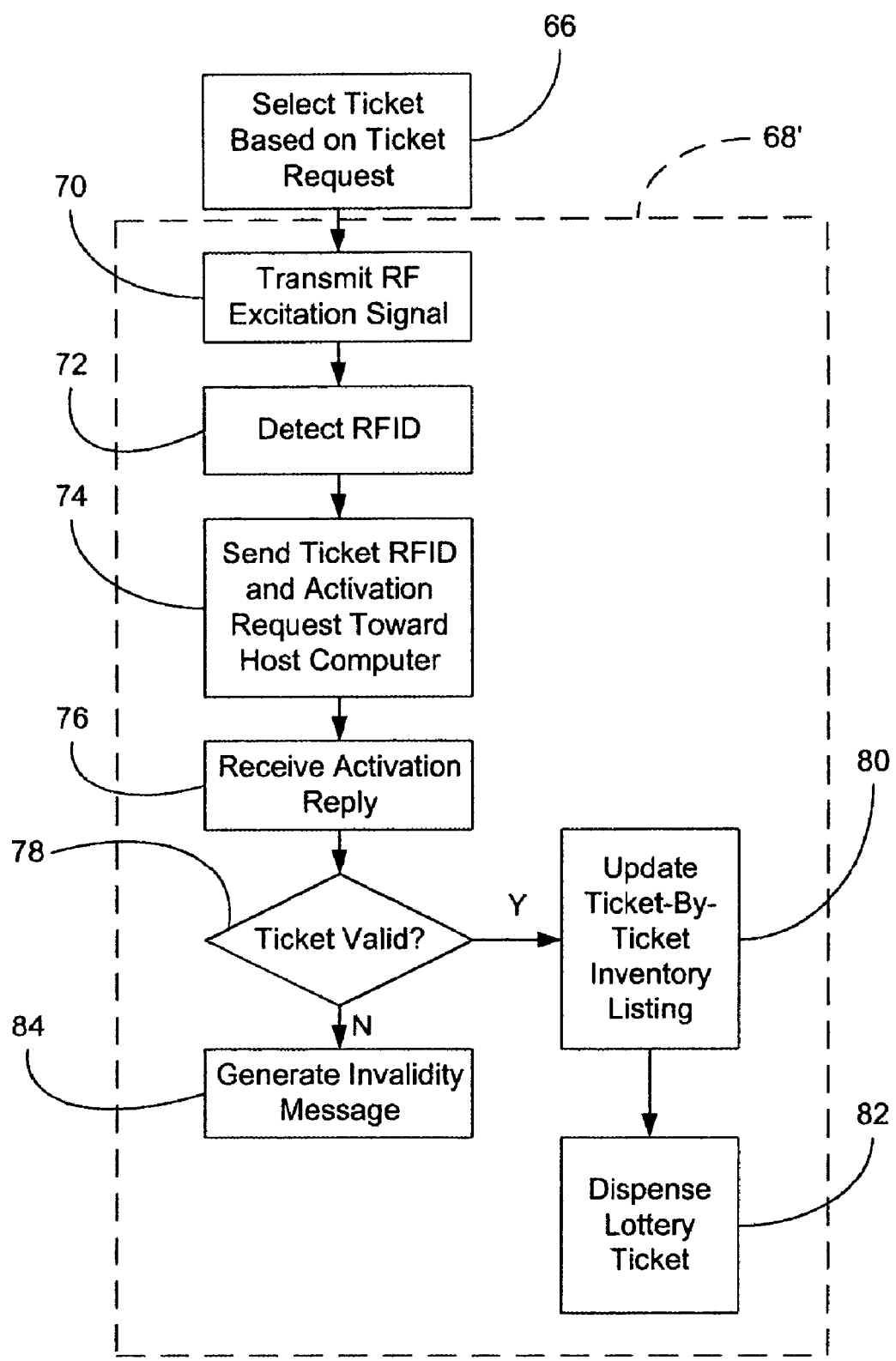
FIG. 5A is a flowchart of an example of a process of activating a ticket RFID according to one embodiment of the invention.

FIG. 5A shows one approach to activating a game ticket based on a ticket RFID in greater detail at processing block 68'. Specifically, an RF excitation signal is transmitted at block 70, where the excitation signal causes the game ticket to transmit the ticket RFID. The transmitted RFID is detected at block 72, and block 74 provides for sending information contained in the ticket RFID and an activation request toward the host computer. An activation reply is received at block 76, where a determination is made at block 78 as to whether the ticket is valid based on the activation reply. If the game ticket is valid, it may be activated. Thus, if the activation reply indicates that the game ticket is valid, a ticket-by-ticket inventory listing is updated at block 80 and the game ticket is dispensed at block 82. The ticket-by-ticket inventory listing can be maintained in a memory of the RFID gaming system and organized into any appropriate data structure such as a relational database. Block 82 may also involve deactivating a door alarm of the game ticket retailer 22, 24 (FIG. 1) premises with regard to the specific game ticket in order to reduce the likelihood of theft even further. If the activation reply indicates that the game ticket is invalid, block 84 provides for generating an invalidity message such as "Activation Not Authorized." The invalidity message can be associated with an appropriate signal to prevent the ticket dispenser from releasing the selected game ticket.

Figure 5B:
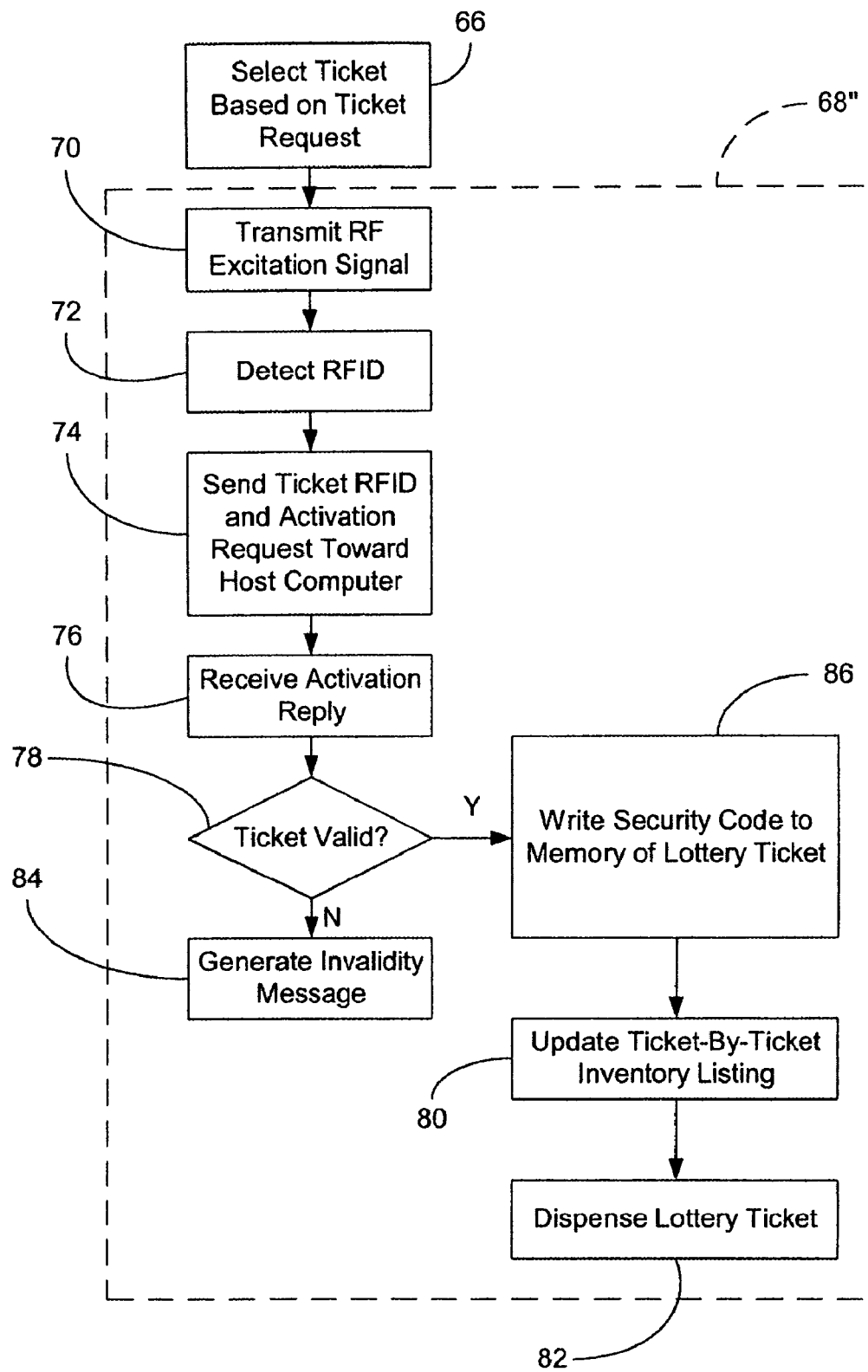
FIG. 5B is a flowchart of an example of a process of activating a ticket RFID according to an alternative embodiment of the invention.

FIG. 5B shows an alternative approach to activating the game ticket based on the ticket RFID at processing block 68". Block 68" is identical to the process shown in block 68' (FIG. 5A), with the exception that a security code is written to the memory of the game ticket at block 86 if the activation reply indicates that the game ticket is valid. The security code can include additional information such as the ticket value 58 (FIG. 10B) and activation status 60 (FIG. 10B) and enables redemption of the game ticket to take place locally at the RFID lottery system. Thus, the activation reply may further indicate whether the game ticket has been activated (e.g., activation status) and whether the game ticket is a winning ticket (e.g., ticket value). It should be noted that the security code can be generated partially or entirely by either the host computer or the RFID gaming system, where generation of the security code is merely dependent upon the activation reply indicating that the game ticket is valid.

Turning now to FIG. 6, a method 88 of validating game tickets is shown. The method 88 may be implemented by an RFID gaming system as a set of instructions capable of being executed by a processor to achieve game ticket validation. The instructions can be written using any number of well-known software programming techniques and can be stored in a wide variety of machine-readable media, such as EEPROM, CD-ROM, DRAM, etc. Generally, processing block 90 provides for receiving a validation request, where the validation request may be input by a consumer or retailer employee via any commercially available interface. The validation request may also be implied from the game ticket being held within reading distance of an RFID reader. A ticket RFID is read from the memory of the game ticket at block 92 based on the validation request, where the ticket RFID defines a validation code corresponding to the game ticket.

Figures 7A, 7B:
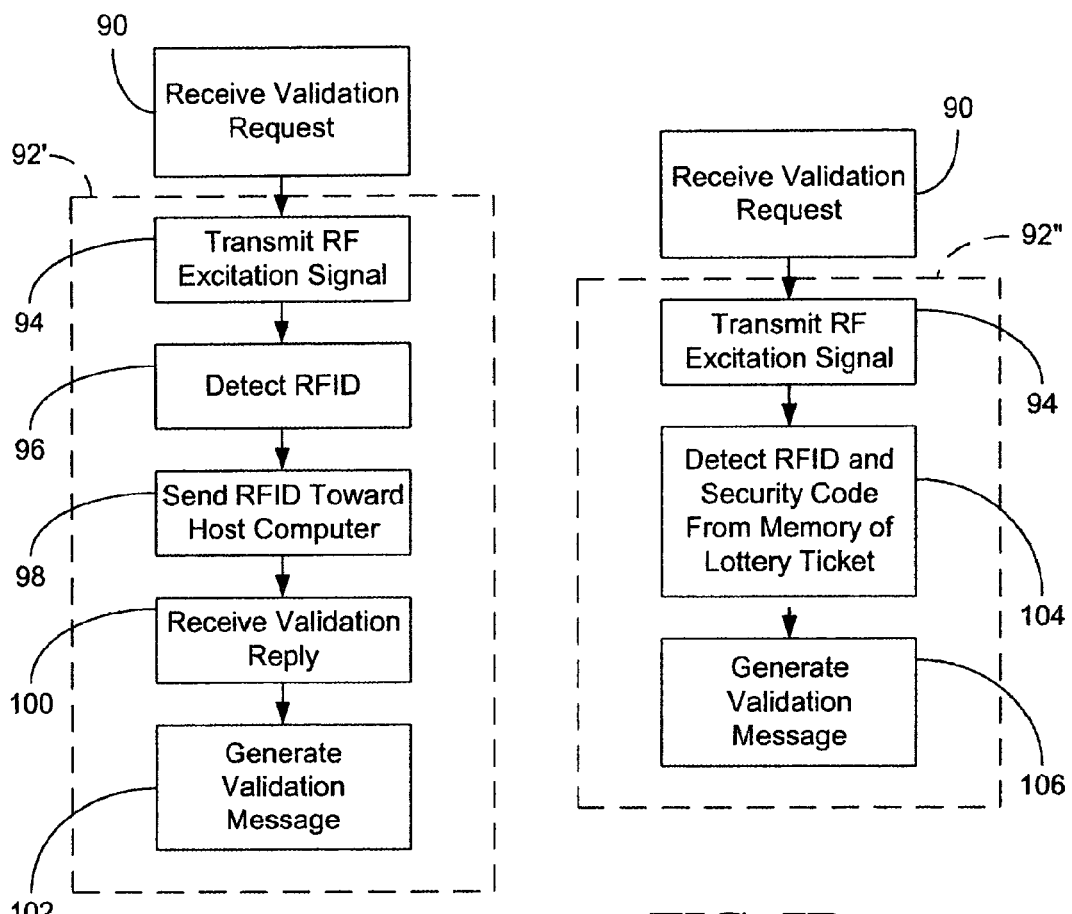
FIG. 7A is a flowchart of an example of a process of reading a ticket RFID from a memory of a game ticket according to one embodiment of the invention.
FIG. 7B is a flowchart of an example of a process of reading a ticket RFID from a memory of a game ticket according to an alternative embodiment of the invention.

FIG. 7A shows one approach to reading the ticket RFID in greater detail at block 92'. Specifically, block 94 provides for transmitting an RF excitation signal, where the excitation signal causes the game ticket to transmit the ticket RFID and block 96 provides for detecting the transmitted RFID. Information contained in the ticket RFID is sent toward the host computer at block 98 and a validation reply to the ticket RFID is received at block 100. Block 102 provides for generating a validation message such as "$100 Redemption Authorized" based on the validation reply.

FIG. 7B shows an alternative approach to reading the ticket RFID at processing block 92". Specifically, an RF excitation signal is transmitted at block 94 as already discussed. The transmitted RFID, which includes a security code, is detected at block 104. The security code may include information such as the ticket value 58 (FIG. 10B) and activation status 60 (FIG. 10B), where the security code was written to the memory of the game ticket at the time of activation and dispensing to the consumer. Thus, if the game ticket was obtained unlawfully and outside the standard activation and dispensing process, the security code will not be included in the ticket RFID and validation cannot be completed. Furthermore, such an approach enables local validation of the game ticket without the need for communication between the RFID gaming system and the host computer. It should be noted that although the approach shown in block 92" may eliminate the need for communicating the validation information back to the host computer at the time of validation, it may be desirable to send the validation information to the host computer at a later time in a cumulative report such as a monthly accounting report. In any event, block 106 provides for generating a validation message based on the security code.

Figure 8:
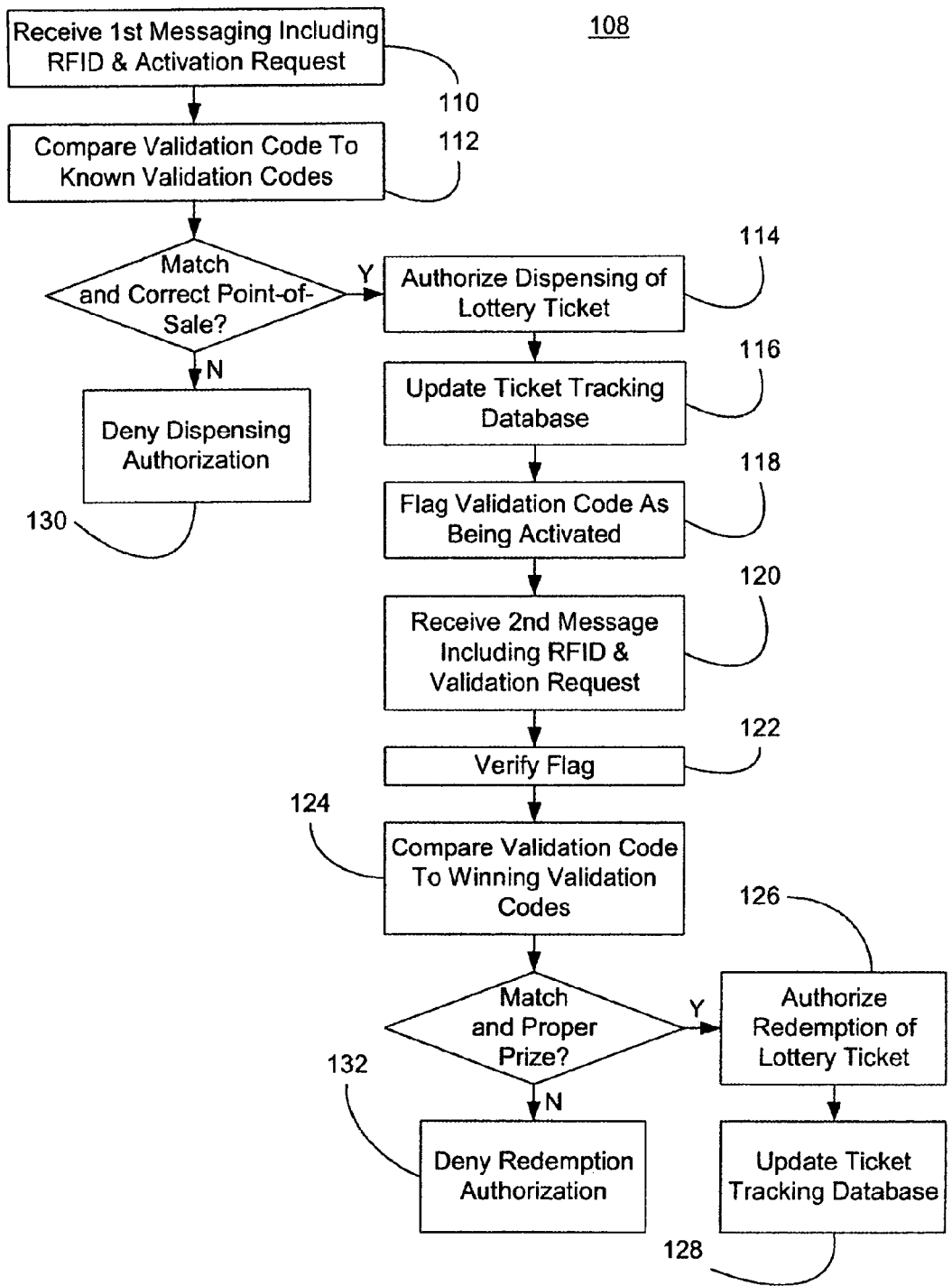
FIG. 8 is a flowchart of an example of a method of managing a game ticketing system according to one embodiment of the invention.

Turning now to FIG. 8, a method 108 of managing a gaming system such as a lottery ticketing system is shown. Method 108 can be implemented in a host computer as a set of instructions capable of being executed by a processor to manage one or more lottery systems. The instructions can be written using any number of well-known software programming techniques and can be stored in a wide variety of machine readable media. Generally, a first message including information contained in a ticket RFID and an activation request is received at block 110. The information contained in ticket RFID defines a validation code of a lottery ticket. Block 112 provides for comparing the validation code to a list of known validation codes. If the validation code matches a known validation code and the activation request defines a correct point-of-sale based on the known validation code, dispensing of the lottery ticket to the consumer is authorized at block 114. In addition, a ticket tracking database is updated based on the first message at block 116. Block 118 provides for flagging the validation code as being activated. A second message including information contained in the ticket RFID and a validation request is received at block 120, and block 122 provides for verifying that the validation code has been flagged as being activated. Block 124 provides for comparing the validation code to a list of winning validation codes. If the validation code matches one of the winning validation codes and the validation request defines a proper prize based on the winning validation code, redemption of the lottery ticket is authorized at block 126. In addition, the ticket tracking database is updated at block 128 based on the second message. If the validation code does not match one or more of the known validation codes, or if the activation request does not define a correct point-of-sale based on the known validation code, activation and dispensing authorization is denied at block 130. If the validation code does not match one or more of the winning validation codes, or if the validation request does not define a proper prize, redemption authorization is denied at block 132.

Thus, the use of RFIDs in gaming systems provides a unique and robust approach to addressing the shortcomings associated with conventional systems. Furthermore, as the cost of RFID tags and related technology continues to decrease, the use of the techniques described herein will become even more popular. For example, RFID lottery tickets would provide a very low cost solution for ticket-by-ticket vending machines. This is particularly true considering the cost associated with installing bar code scanners in every bin of a vending machine.

FURTHER EMBODIMENTS

Figure 11:
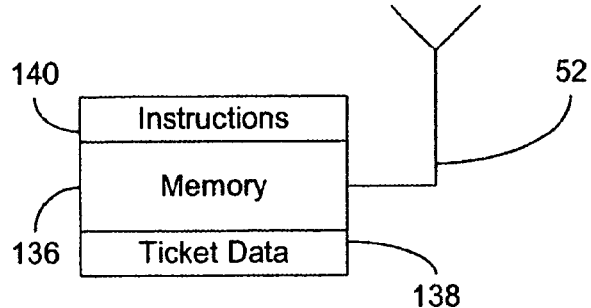
FIG. 11 is a block diagram of an example of a game ticket transponder according to an alternative embodiment of the invention.

RFID approaches can be used in a number of different ways to improve the game ticketing process. For example, FIG. 11 shows a transponder 134 in which a memory 136 stores ticket data 138. The ticket data can include a wide variety of information and can be transmitted as an RF signal via antenna 52 according to instructions 140.

Figure 12:
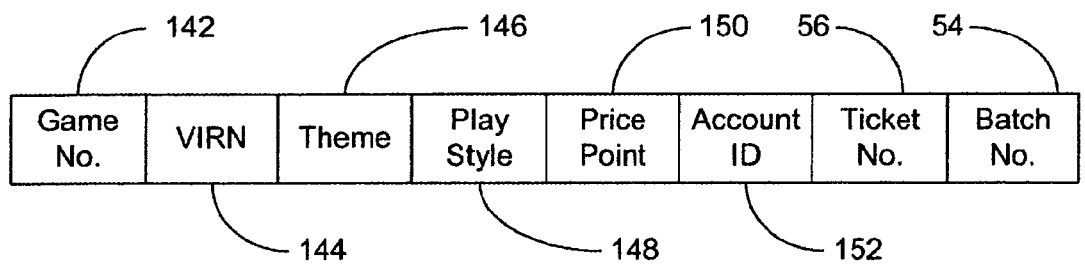
FIG. 12 is a diagram of an example of ticket data according to an alternative embodiment of the invention.

One approach to the ticket data is shown in FIG. 12 at 138'. Specifically, the ticket data 138' can include a game number 142, which uniquely identifies the particular game being implemented by the corresponding game ticket. A void if removed number (VIRN) 144 provides additional security and a theme description 146 identifies the theme that corresponds to the game ticket. Ticket data 138' may also include a play style 148 and price point 150 for the game ticket. As will be discussed in greater detail below, player account information such as an account identifier 152 can enable enhanced customization during ticket dispensing and validation. As already discussed, a validation code represented by ticket number 56 and batch number 54 can also be included in the ticket data 138'.

Figure 13:
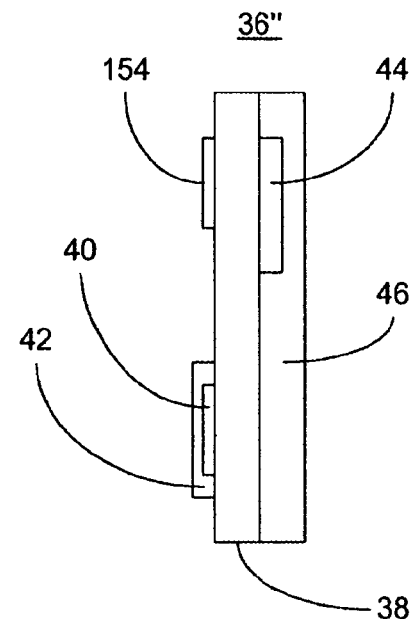
FIG. 13 is a side view of an example of a game ticket according to an alternative embodiment of the invention.

FIG. 13 illustrates that a back-up validation code 154 can be coupled to the substrate 38 of the game ticket 36" as a precautionary measure. The back-up validation 154 can enable manual entry of the ticket data in the event of a failure of the RFID stored in transponder 44 or a failure of the RFID reader. The back-up validation code 154 can be a bar code, a series of digits, or both.

Figure 14:
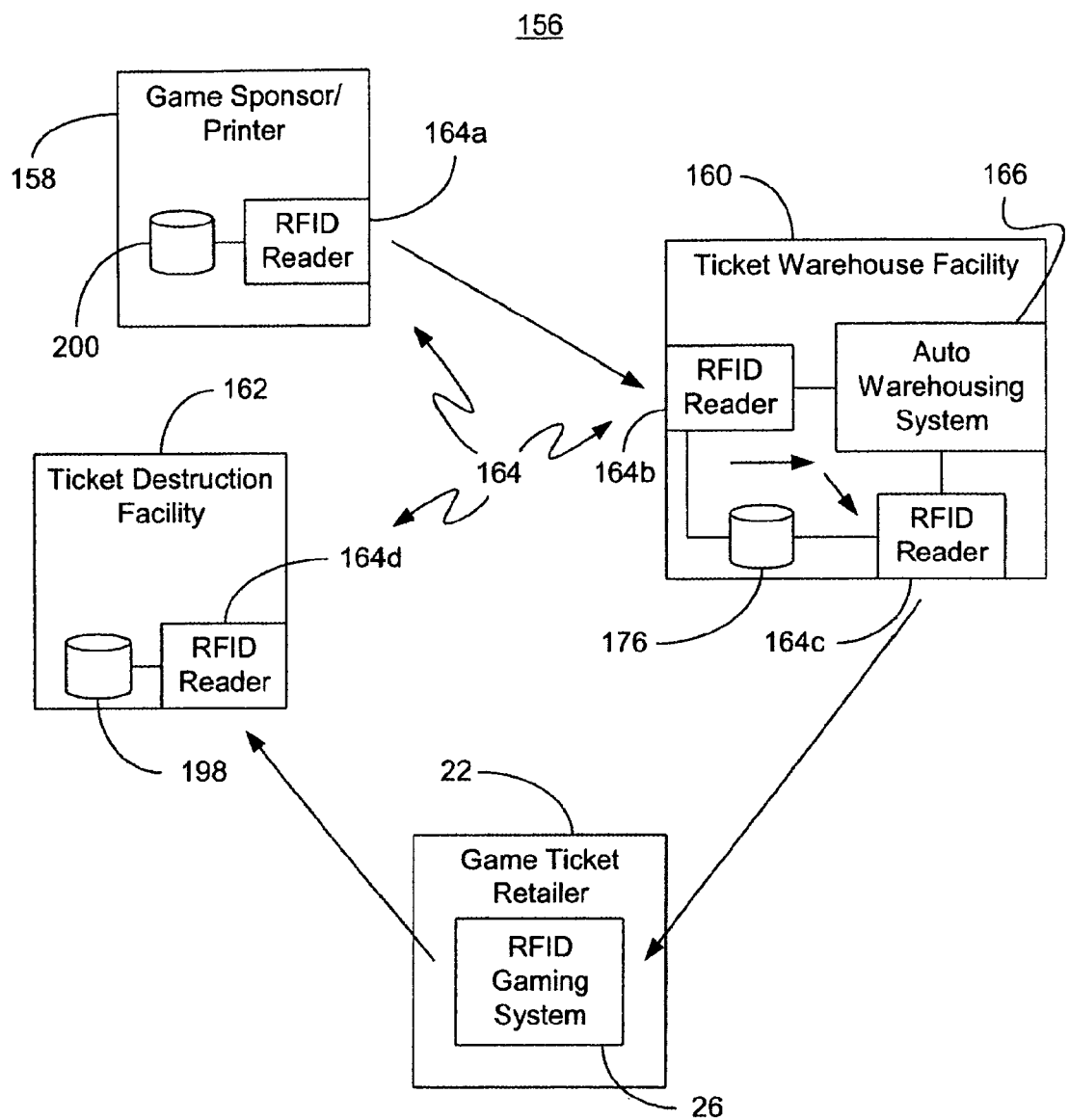
FIG. 14 is a block diagram of an example of a game ticketing architecture according to an alternative embodiment of the invention.

Turning now to FIG. 14, a game ticketing architecture 156 that includes a game sponsor/printer facility 158 such as a lottery facility, a ticket warehouse facility 160 and a ticket destruction facility 162, in addition to game ticket retailer 22. The architecture 156 illustrates one example of a life cycle for an RFID game ticket (not shown). The game ticket retailer 22 has an RFID gaming system 26 and the other participants in the supply chain have RFID readers 164 (164a-164d). Using RFID readers 164 as shown in facilities 158, 160, 162, enables tickets to be tracked on an individual basis from the moment of creation to the moment of destruction. As a result, greater inventory resolution and enhanced accounting can be achieved. In addition, advanced systems such as automated warehousing system 166 can be used to provide greater control over the movement of gaming tickets.

Figure 15:
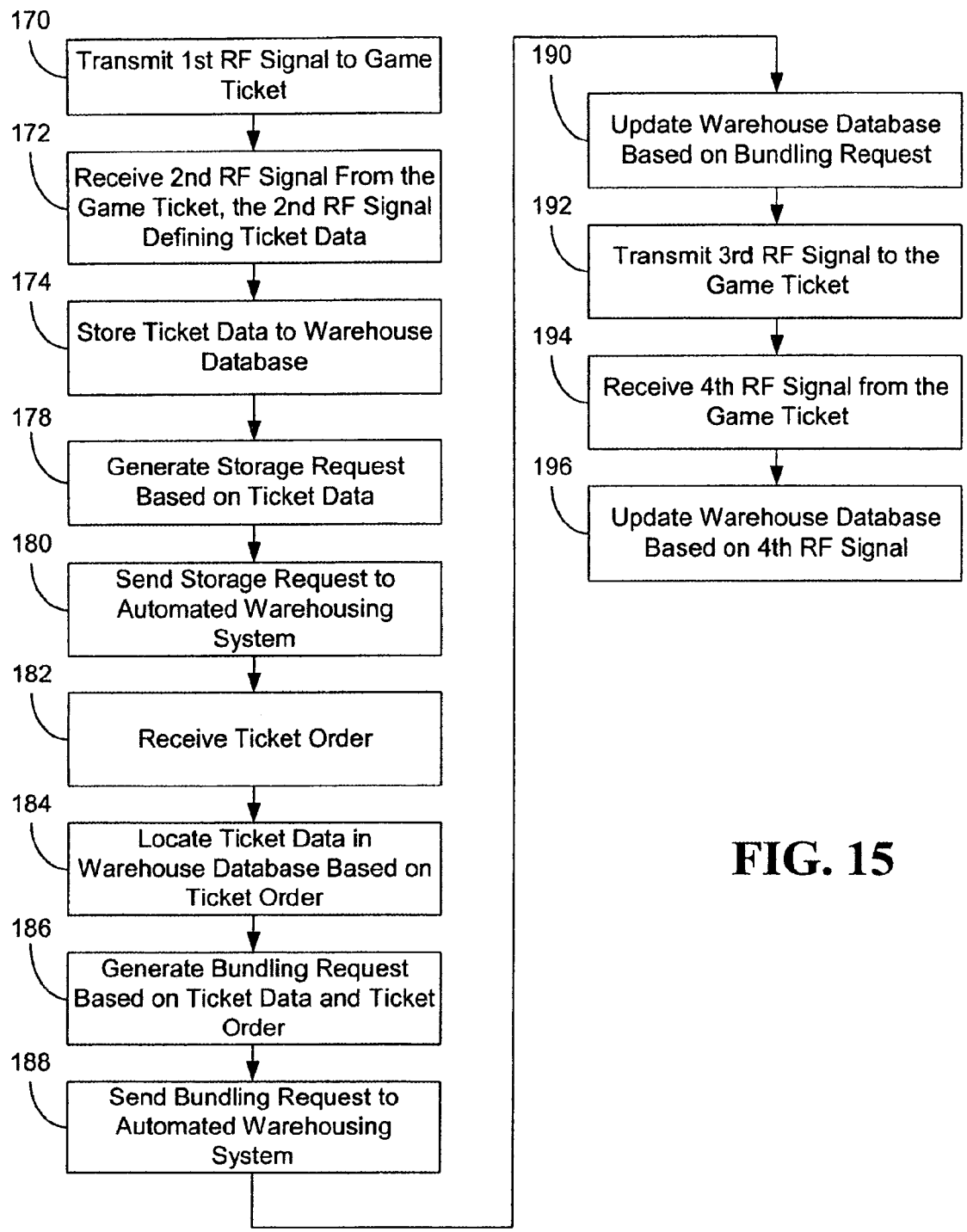
FIG. 15 is a flowchart of an example of a method of distributing game tickets according to one embodiment of the invention.

For example, FIG. 15 shows a method 168 of distributing game tickets that provides a number of advantages over conventional approaches. With continuing references to FIGS. 14 and 15, the method 168 can be implemented in warehouse facility RFID readers such as RFID readers 164b and 164c as a set of instructions capable of being executed by a processor to achieve ticket distribution. The instructions can be written using any number of well-known software programming techniques and can be stored in a wide variety of machine-readable media such as EEPROM, CDROM, DRAM, etc. Generally, processing block 170 provides for transmitting a first RF signal to a game ticket, and block 172 provides for receiving a second RF signal from the game ticket. The second RF signal is responsive to the first RF signal as already discussed, and defines ticket data corresponding to the game ticket. The ticket data is stored to a database such as a warehouse database 176 at block 174. Block 178 provides for generating a storage request based on the ticket data, and block 180 provides for sending the storage request to the automated warehousing system 166. The automated warehousing system 166 may be any commercially available "pick-and-pack" system, and can use robotics to automate the storage and retrieval of game tickets.

When a ticket order is received at block 182, the ticket data can be located in the warehouse database at block 184 based on the ticket order. A ticket order may identify any or all of the types of information included in the ticket data, where the database 176 is searchable on any of the fields. A bundling request is generated at block 186 based on the ticket data and the ticket order. Thus, different types of game tickets can be identified and packaged into the same bundle. Block 188 provides for sending the bundling request to the automated warehousing system 166, and block 190 provides for updating the warehouse database 176 based on the bundling request. A third RF signal is transmitted to the game ticket at block 192 and a fourth RF signal is received from the game ticket at block 194, where the fourth RF signal is responsive to the third RF signal and defines the ticket data. The warehouse database is updated at block 196 based on the fourth RF signal. Generally, the first and second RF signals are associated with the game ticket entering the warehouse facility 160, and the third and fourth RF signals are associated with the game ticket leaving the warehouse facility 160. As a result, the illustrated approach provides greater security, enhanced control and improved accountability. It will be appreciated that similar benefits can be achieved at the game sponsor facility 158 and the ticket destruction facility 162 by using the above-described techniques. For example, a ticket destruction database 198 can store ticket data at the ticket destruction facility 162 and a printer database 200 can store ticket data at the game sponsor facility 158. In such a case, RFID readers 164a, 164d may retrieve the ticket data from the game tickets and communicate with the printer database 200 and the ticket destruction database 198. It should be noted that the readers 164 and the databases 176, 198 and 200 can all be interconnected via a network (not shown) in order to facilitate information sharing.

Figure 16:
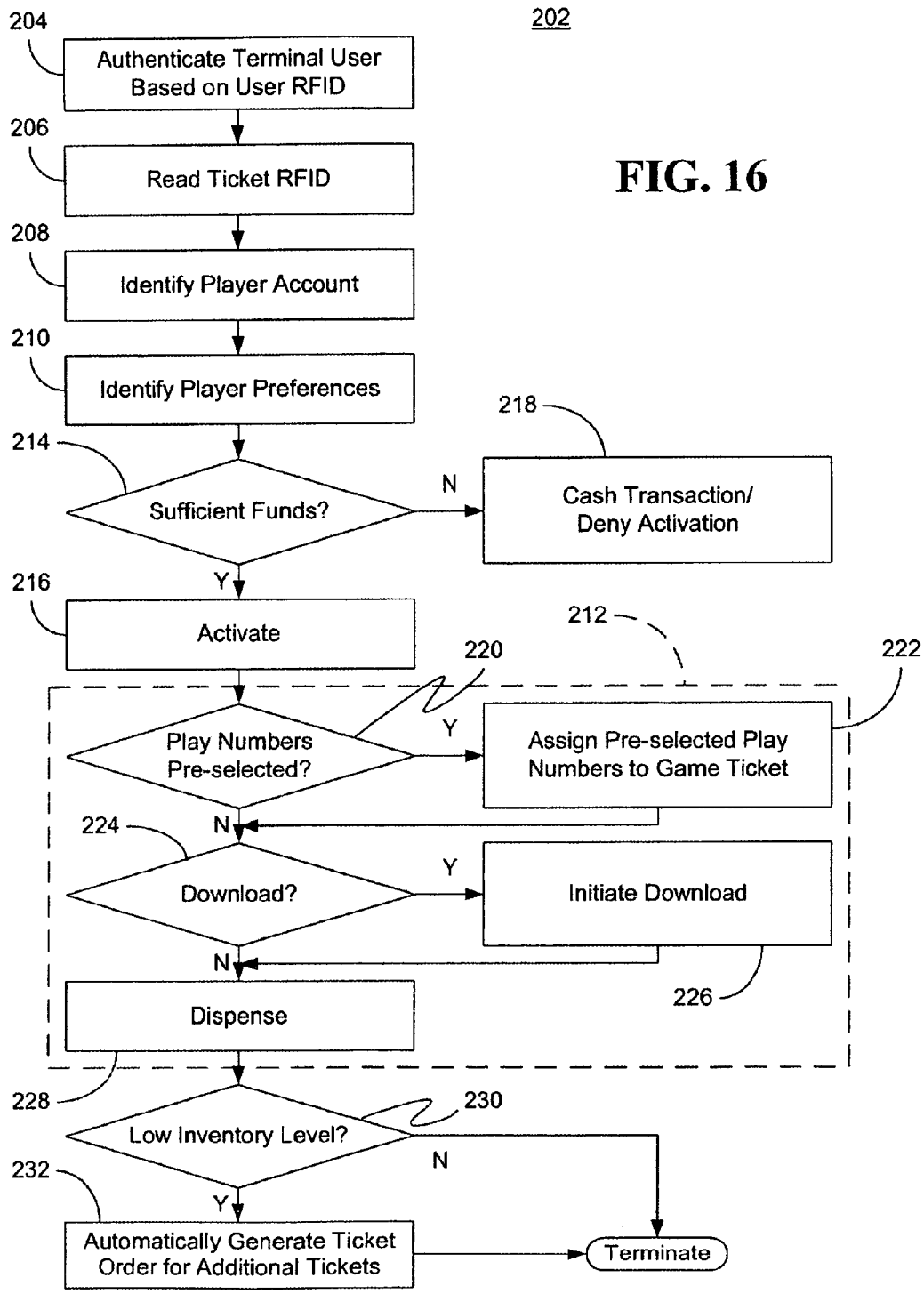
FIG. 16 is a flowchart of an example of a method of dispensing game tickets according to an alternative embodiment of the invention.

Turning now to FIG. 16, a method 202 of dispensing game tickets is shown. Method 202 can be implemented in an RFID gaming system such as gaming system 26 (FIG. 14) as a set of instructions capable of being executed by a processor to achieve ticket dispensing. Generally, processing block 204 provides for authenticating a terminal user based on a user RFID that identifies the terminal user. Such a "sign-on" process can involve reading the user RFID from a memory of an employee badge and enhances security. A ticket RFID is read from a game ticket at block 206 and a player account is identified at block 208. The player account can be associated with a retailer of the game ticket, a promoter of the game ticket, a credit card company, or any other appropriate extender of credit. Block 210 provides for identifying one or more player preferences associated with the player account, where the game ticket is dispensed in accordance with the player preferences at block 212, discussed in greater detail below. If it is determined at block 214 that the player account has sufficient funds to pay for the game ticket, the game ticket is activated at block 216. Otherwise, a cash transaction is implemented or activation of the game ticket is denied at block 218.

As already noted, the game ticket can be dispensed in accordance with the player preferences at block 212. In the illustrated example, block 220 provides for determining whether play numbers have been pre-selected. If so, the pre-selected play numbers are assigned to the game ticket at block 222. Block 224 provides for determining whether a download destination such as personal digital assistant (PDA) or desktop computer has been identified. If so, block 226 provides for triggering a transaction summary download to the download destination, where the transaction summary provides a record of the game ticket purchase. It should be noted that other preferences may also be implemented. In any event, the game ticket is dispensed at block 228.

Method 202 also provides for determining whether an inventory level for the game ticket has fallen below a predetermined threshold at block 230. The threshold can be set by the game ticket retailer based on the inventory requirements of the retailer and the lead time parameters associated with the particular game ticket, game sponsor and/or warehousing facility. If the inventory level for the game ticket falls below the predetermined threshold, block 232 provides for automatically generating a ticket order for additional tickets. The additional tickets may be for the same or a different game.

Figure 17:
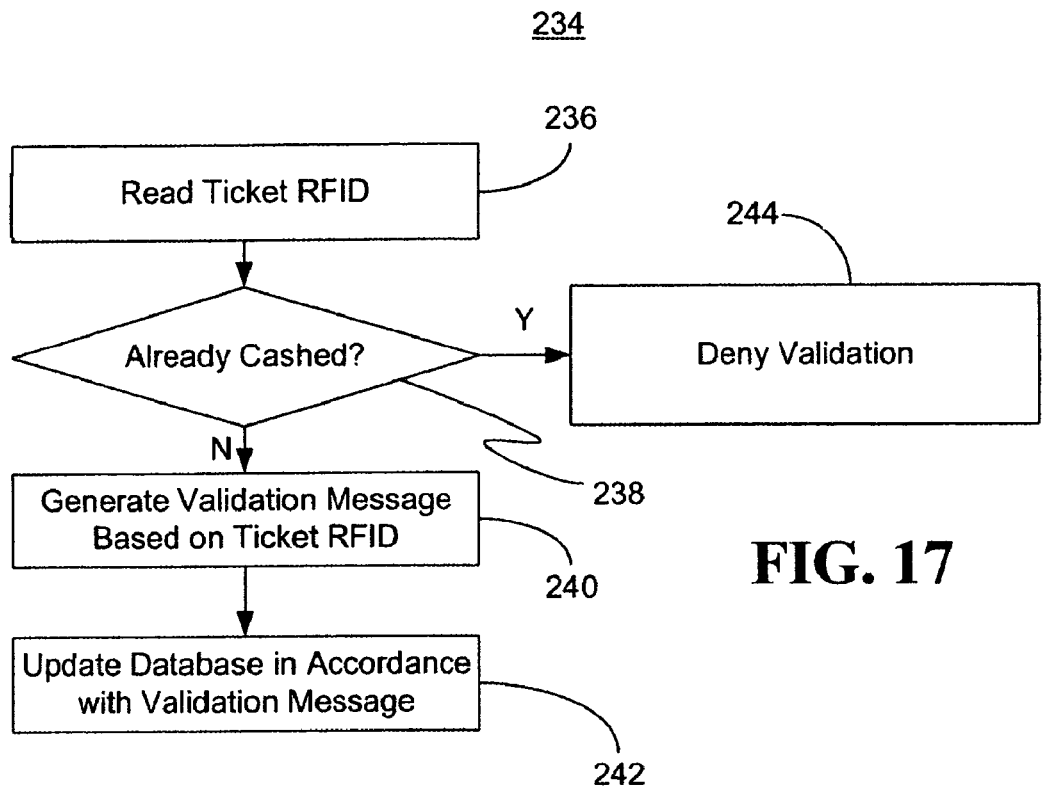
FIG. 17 is a flowchart of an example of a method of validating game tickets according to an alternative embodiment of the invention.

Turning now to FIG. 17, a method 234 of validating game tickets is shown. Method 234 can be implemented in an RFID gaming system 26 (FIG. 14) as a set of instructions stored in a machine-readable medium capable of being executed by a processor to validate tickets. Specifically, block 236 provides for reading a ticket RFID from a memory of a game ticket, and block 238 provides for determining whether the game ticket has been cashed based on the RFID. The determination at block 238 can be made by using the RFID to access a ticket-by-ticket inventory listing, where the listing indicates whether the game ticket has been cashed, or the RFID itself may indicate whether the game ticket has been cashed. Such a determination enhances security further. If the ticket has not already been cashed, a validation message is generated at block 240 based on the ticket RFID and a database is updated in accordance with the validation message at block 242. Updating the database enables subsequent cashing of the ticket to be prevented or prohibited as shown at block 244 in the denial of validation.

Figure 18:
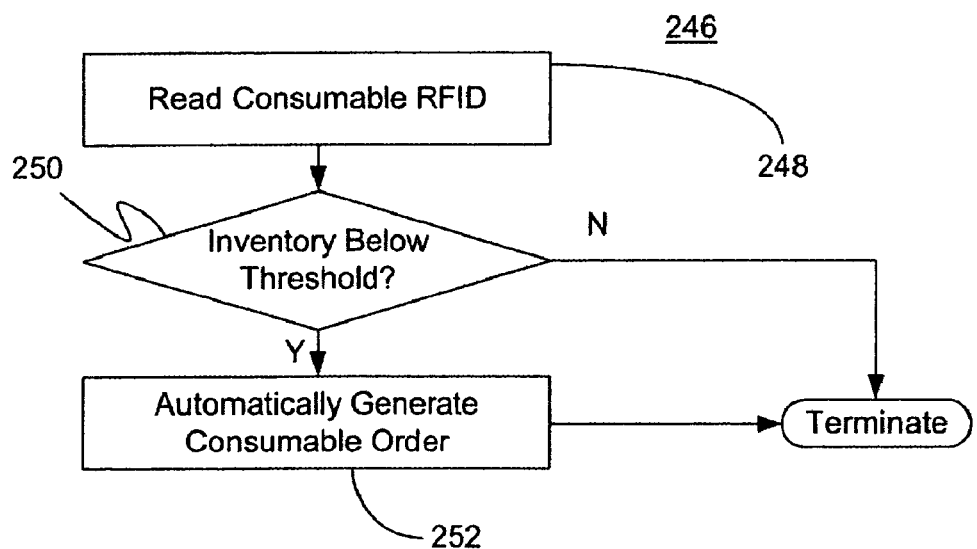
FIG. 18 is a flowchart of an example of a method of tracking game ticket consumables according to one embodiment of the invention.

FIG. 18 shows a method 246 of tracking game ticket consumables. Method 246 can also be implemented in an RFID gaming system 26 (FIG. 4) as a set of instructions stored in a machine-readable medium where the instructions are capable of being executed by a processor to track game ticket consumables. Block 248 provides for reading a consumable RFID from a game ticket consumable. Game ticket consumables include, but are not limited to paper stock, writing implements and marketing materials associated with a game. If it is determined at block 250 that the inventory level for the game ticket consumable has fallen below a predetermined threshold, a consumable order for additional consumables is automatically generated at block 252.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of dispensing game tickets comprising: reading a ticket radio frequency identifier (RFID) from a game ticket; identifying a player account; and responsive to the player account having sufficient funds to pay for the game ticket, activating the game ticket based on the RFID read from the ticket.

2. The method of claim 1, wherein the player account is an account associated with retailer of the game ticket.

3. The method of claim 1, wherein the player account is an account associated with a promoter of the game ticket.

4. The method of claim 1, wherein the player account is an account associated with a credit card company.

5. The method of claim 1, further including: identifying one or more player preferences associated with the player account; and dispensing the game ticket in accordance with the player preferences.

6. The method of claim 5, wherein the player preferences include play numbers, the method further including assigning the play numbers to the game ticket.

7. The method of claim 5, wherein the player preferences include a download destination, the method further including triggering a transaction summary download to the download destination.

8. The method of claim 5, wherein the ticket RFID defines a player account identifier and the player preferences.

* * * * *